Feb. 16, 1932. A. S. HUBBARD 1,845,151
CURRENT RECTIFYING SYSTEM AND APPARATUS
Filed May 6, 1929 2 Sheets-Sheet 1

Inventor
Albert S. Hubbard
By [signature]
his Attorney

Inventor
Albert S. Hubbard

Patented Feb. 16, 1932

1,845,151

UNITED STATES PATENT OFFICE

ALBERT S. HUBBARD, OF BETHEL, CONNECTICUT, ASSIGNOR, BY MESNE ASSIGNMENTS, TO GOULD STORAGE BATTERY CORPORATION, OF DEPEW, NEW YORK, A CORPORATION OF DELAWARE

CURRENT RECTIFYING SYSTEM AND APPARATUS

Application filed May 6, 1929. Serial No. 360,907.

The invention relates to systems for the rectification of alternating current and has for its general object the provision of a novel arrangement of apparatus and circuits whereby direct current at different desired voltages may be obtained from an alternating current supply.

Another object of the invention is to provide a current rectifying or converting system embodying transformers so arranged as to utilize both halves of the alternating current wave for producing a pulsating direct current without great loss, it being also a feature to provide filter means in the output for smoothing out the ripples so that the current will be constant and uniform and therefore suitable for the operation of radio apparatus or the like where a current of this type is necessary.

Another important object of the invention is to provide a system of this character embodying transformers having divided secondaries with which are associated and connected rectifiers, the arrangement consequently consisting of a plurality of units whereby current of different voltages may be obtained.

Another object is to subdivide the rectifying or converting means so as to limit the voltage strains imposed on the units of such rectifying or converting means.

A further object of the invention is to provide a system including apparatus adjusted to the voltage of the primary supply and to permit of adjusting the value of the converted current and voltage to the said devices supplied by such converted currents and voltages.

An additional object of the invention is to provide a system and apparatus to this character which will be simple and inexpensive to assemble or install, positive in action, easy to control or adjust, efficient in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1:
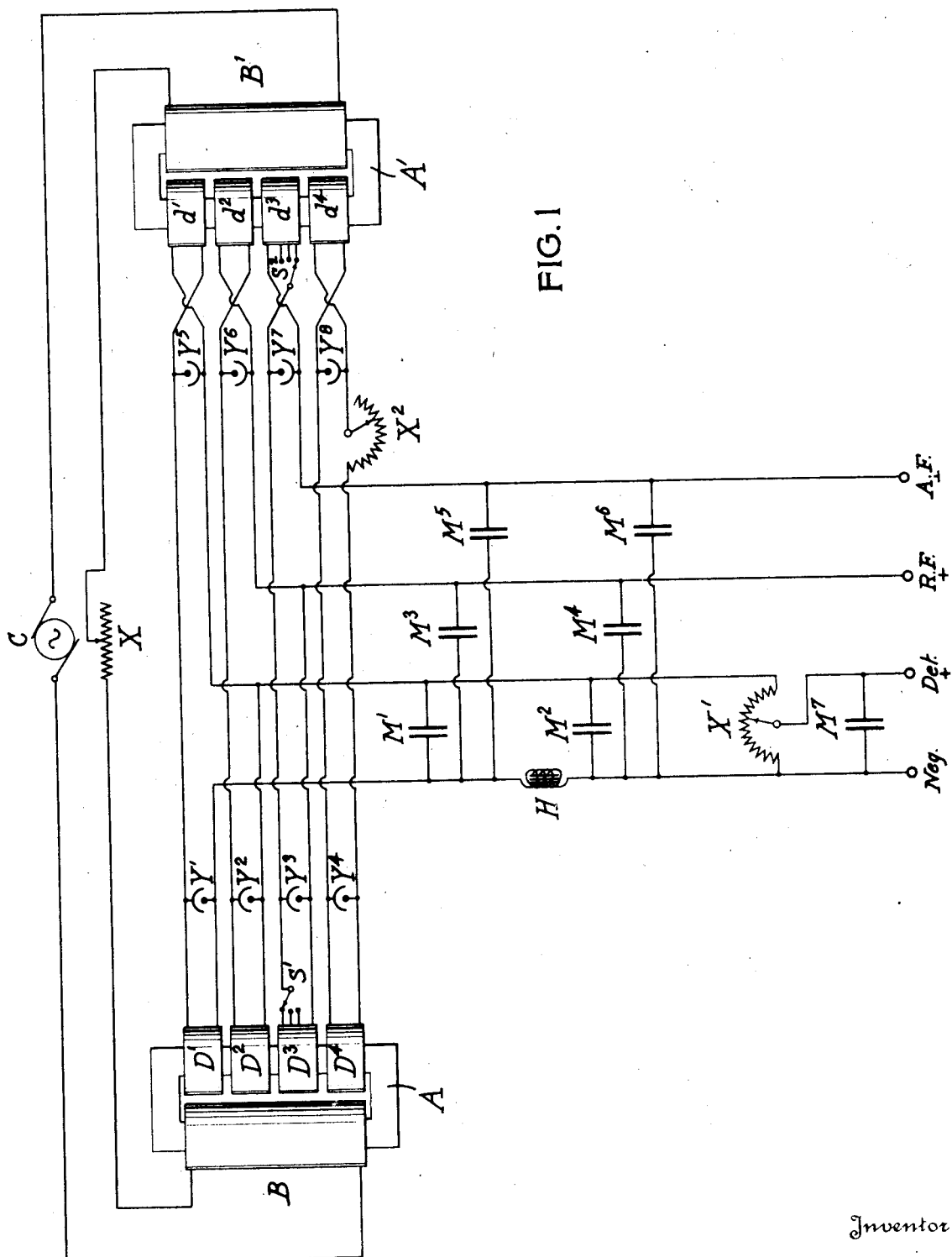
Figure 1 is a diagram showing one form of the invention.

Referring more particularly to the drawings, and especially Figure 1, the letters A and $A^1$ are the cores of two transformers having primary coils B and $B^1$ which are connected in series with each other and with an alternating current source C through an adjusting rheostat X which may be of the manually controlled type and which may have a high positive temperature coefficient. The purpose of this rheostat is to adjust the outfit to the value of the voltage supplied by source C, the high positive temperature coefficient resistance making such adjustment semi-automatic. One transformer has secondaries $D^1$, $D^2$, $D^3$ and $D^4$, and the other has secondaries $d^1$, $d^2$, $d^3$ and $d^4$. The secondaries of the two sets are connected each in opposition as shown, and connected across the respective secondaries are rectifiers $Y^1$, $Y^2$, $Y^3$, $Y^4$, $Y^5$, $Y^6$, $Y^7$ and $Y^8$. It will be seen that these rectifiers are connected to the corresponding secondaries in pairs in such manner that one rectifier of each pair short circuits the corresponding secondary in one transformer during one half of the alternating current cycle while the other rectifier of each pair short circuits the corresponding secondary of the other transformer during the other half of the cycle, this arrangement permitting uni-directional current to be obtained from each pair of rectifiers and the corresponding secondaries to which the pair is connected, as indicated in my prior Patent No. 1,160,610. The uni-directional currents so obtained from $D^1$, $d^1$, $D^2$, $d^2$, $D^3$ and $d^3$ are connected in series. Taps may be taken out from intermediate points in the series to obtain the desired different voltages, for example for supplying the plate voltages for the detector, radio frequency and amplifier tubes of a radio set, such taps being indicated in the drawings by appropriate legends. When the system is used for this purpose, it is necessary to provide a filtering means to smooth out the ripples in the pulsating and uni-directional current passing to the tubes and this filtering means may comprise an inductance H and a plurality of condensers $M^1$, $M^2$, $M^3$, $M^4$, $M^5$ and $M^6$, the inductance being located in series in the negative lead and the various condensers being shunted across from the negative lead to the different positive leads as clearly indicated. A rheostat $X^1$ may be connected between the negative lead and the tap for the detector tube voltage to permit obtaining fine graduations of voltage to be applied to the detector tube, and a condenser $M^7$ is provided to by-pass the tube.

The secondaries $D^4$ and $d^4$ are, as mentioned above, connected in opposition in the same manner as the other corresponding secondaries, but their uni-directional current output is passed through and dissipated in a rheostat $X^2$, the purpose of this arrangement being to provide for adjustment of the maximum uni-directional outputs from the other secondary-rectifier combinations, the rheostat $X^2$ causing more or less of the energy available from the transformers to be diverted, depending on the amount of resistance included in the circuit.

A somewhat similar diverting effect may be obtained by omitting the rectifiers $Y^4$ and $Y^8$ and connecting $D^4$ and $d^4$ in series instead of in opposition, and with the circuit closed through $X^2$. This slight variation is illustrated in Figure 2.

Another feature is that one or more of the corresponding secondaries may be tapped or sectionalized and switches $S^1$ and $S^2$ provided to include fewer or more turns in the circuit, thereby providing individual adjustment of the various voltages. These switches $S^1$ and $S^2$ are shown only in association with the secondaries $D^3$ and $d^3$ though it will be understood that they may be provided for each pair of secondaries if such is found advisable or convenient.

Figure 2:
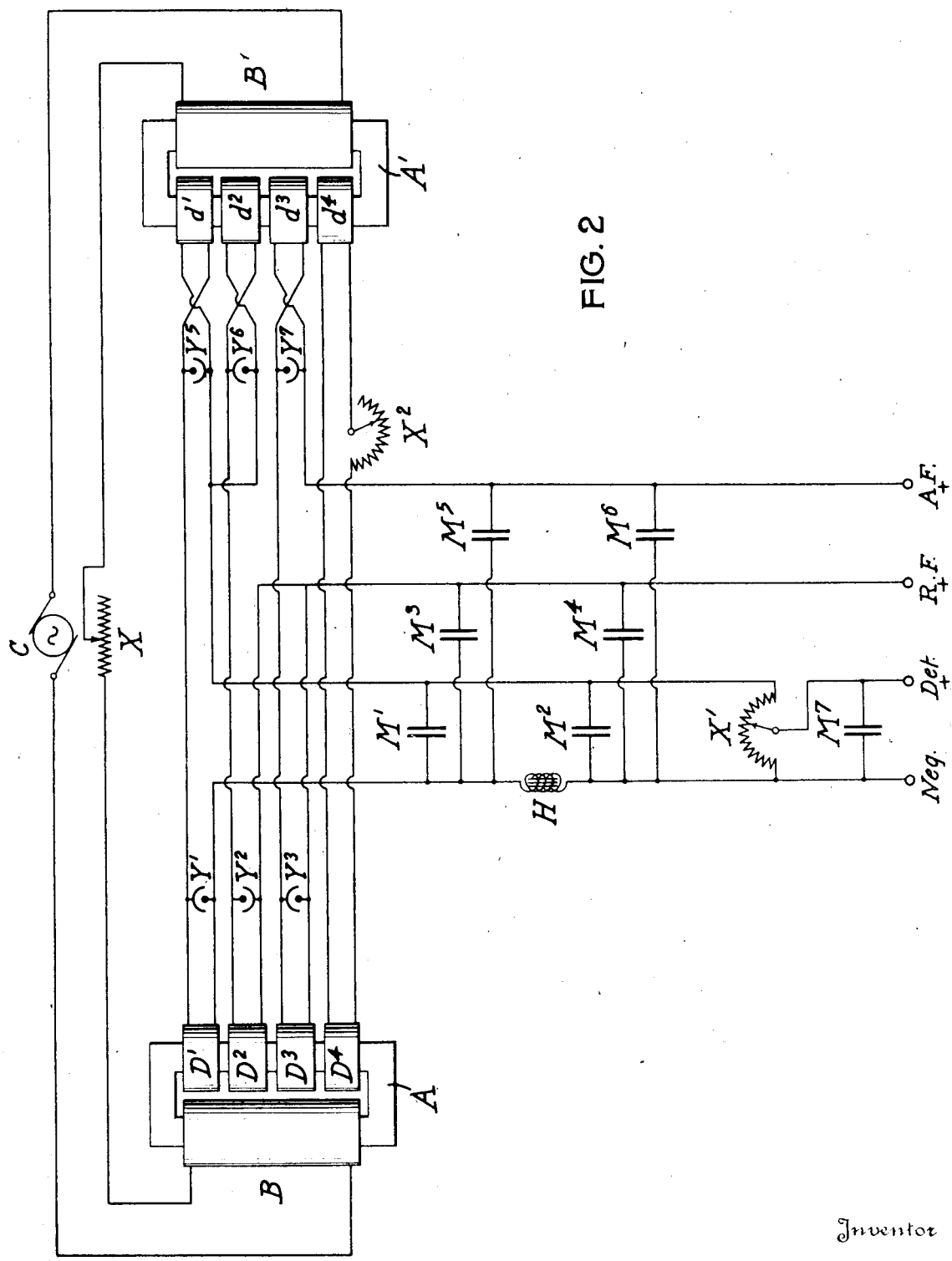
Figure 2 is a diagram illustrating a modification.

In Figure 2 I have shown identically the same apparatus referred to by the same reference characters, the only difference, in addition to the arrangement of the secondaries $D^4$ and $d^4$ in series with their rectifiers $Y^4$ and $Y^8$ omitted, being a slight variation in the connections between the secondaries and the output terminals. The operation is likewise the same.

It is conceivable that several other variations might be resorted to without changing the broad principle involved or the action but it is thought to be unnecessary to illustrate all conceivable modifications.

There is intended to be no particular limitation as to the rectifying means employed as it may be of the wet, dry or gaseous tube type. The exact nature of the windings of the primary and secondary coils of the transformers must necessarily depend upon the input voltage and the desired output voltage and current. The capacity of the various condensers is likewise a matter to be determined either by test or computation and the same is true of the value of the inductance in the negative lead in the output circuit.

From the foregoing description and a study of the drawings it will be apparent that I have thus provided a novel system and apparatus whereby alternating current may be converted or transformed and rectified for supplying direct current for many uses. In some instances it might not be necessary to provide the filter circuit comprising the condensers $M^1$ to $M^6$ and the inductance H but these are illustrated and described as the system is well adapted for employment in connection with the energization of the tubes in a radio apparatus. Another point is that the voltages may be separated, that is for instance the uni-directional voltage obtainable from corresponding secondaries and their rectifiers may be disconnected from the uni-directional voltages obtainable from the other secondaries and associated rectifiers and used for a different purpose. By arranging the secondaries in opposition and providing the pair of rectifiers for each pair of opposed secondaries, it is clear that both halves of the alternating current wave are utilized, this feature avoiding waste of current and also tending to make the output more constant as well as simplifying the filter system necessary to smooth out the ripples. The employment of the rheostat $X^2$ in series with the secondaries $D^4$ and $d^4$ and their rectifiers $Y^4$ and $Y^8$ is an important feature as it provides an adjustment of the maximum uni-directional outputs from the other secondary and rectifier combinations. Actual experimentation has demonstrated that the system is unusually efficient for the purpose specified. It is believed that the arrangement, operation and advantages will be readily apparent to one skilled in the art without further explanation.

While I have shown and described preferred embodiments of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a current rectifying system, separate transformers having their primaries connected in series with an alternating current source, the transformers having divided secondary coils connected respectively in opposed series relation, a rectifier shunted across each secondary of each transformer, and a rheostat interposed in series with two of the secondary divisions for dissipating the energy whereby to provide for adjustment of the maximum uni-directional outputs from the other secondary divisions.

2. In a current rectifying system, the combination of separate transformers having primary coils connected in series with an alternating current source through a variable resistance, each transformer having a plurality of secondary coils, the corresponding secondary coils of the respective transformers being connected in opposition, a rectifier connected across each secondary of each transformer, the opposed pairs of secondaries being connected in series, whereby said rectifiers will operate to produce a uni-directional current utilizing both halves of the alternating current waves, and means for dissipating the energy output from a pair of the opposed secondaries for adjusting the maximum uni-directional outputs from the other secondary-rectifier combinations.

3. In a current rectifying system, separate transformers having their primaries connected in series with an alternating current source, the transformers having divided secondaries, certain of the corresponding secondary divisions being connected in series with each other in opposing relation, a rectifier shunted across each of said opposed secondary divisions, certain other of the corresponding secondary divisions being connected in series in aiding relation, and variable resistance means interposed in said last named connection for dissipating the energy to provide for adjustment of the maximum uni-directional outputs from the opposed secondary divisions.

In testimony whereof I affix my signature.

ALBERT S. HUBBARD.